(No Model.)

J. R. BROMWELL.
ANIMAL TRAP.

No. 488,111. Patented Dec. 13, 1892.

Witnesses
Harry L. Ames
N. P. Riley

Inventor
J. R. Bromwell.
By his Attorneys,
C. A. Snow & Co.

THE NORRIS PETERS CO., PHOTO-LITHO., WASHINGTON, D. C.

UNITED STATES PATENT OFFICE.

JOHN R. BROMWELL, OF NASHVILLE, TENNESSEE, ASSIGNOR TO CHARLES A. BLACK, OF SAME PLACE.

ANIMAL-TRAP.

SPECIFICATION forming part of Letters Patent No. 488,111, dated December 13, 1892.

Application filed June 8, 1892. Serial No. 435,984. (No model.)

*To all whom it may concern:*

Be it known that I, JOHN R. BROMWELL, a citizen of the United States, residing at Nashville, in the county of Davidson and State of Tennessee, have invented a new and useful Self-Setting Animal-Trap, of which the following is a specification.

The invention relates to improvements in traps.

The object of the present invention is to provide a simple and inexpensive self-setting animal-trap in which a number of animals may be caught and caged.

The invention consists in the construction and novel combination and arrangement of parts hereinafter fully described, illustrated in the accompanying drawings, and pointed out in the claims hereto appended.

Figure 1:
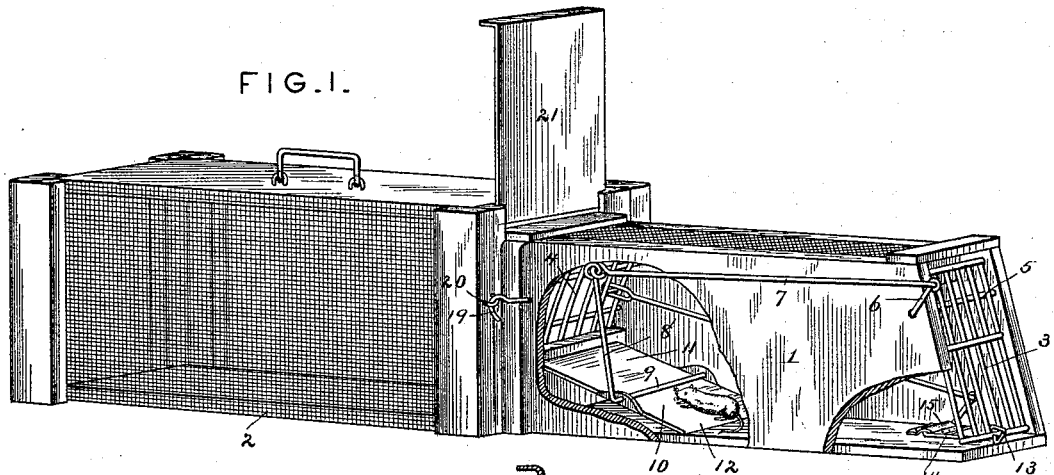
Figure 2:
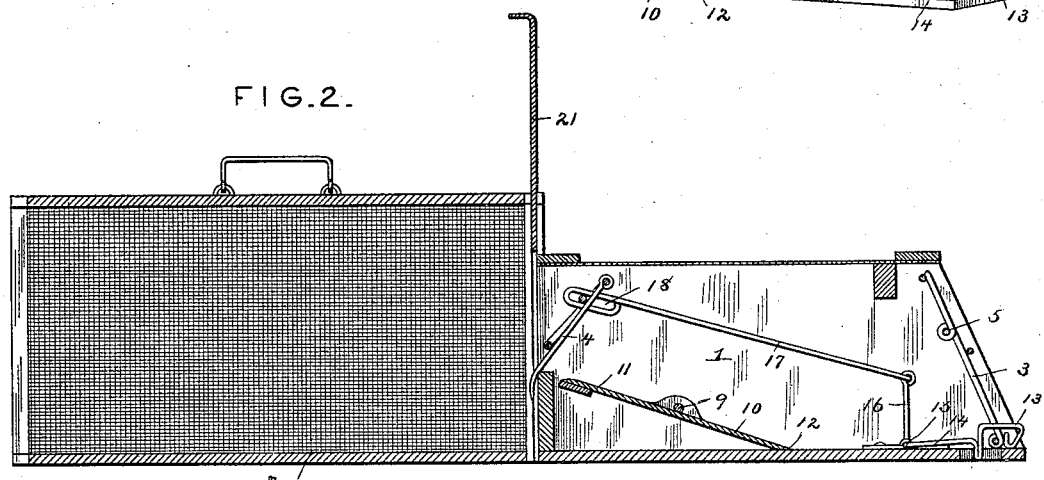
Figure 3:
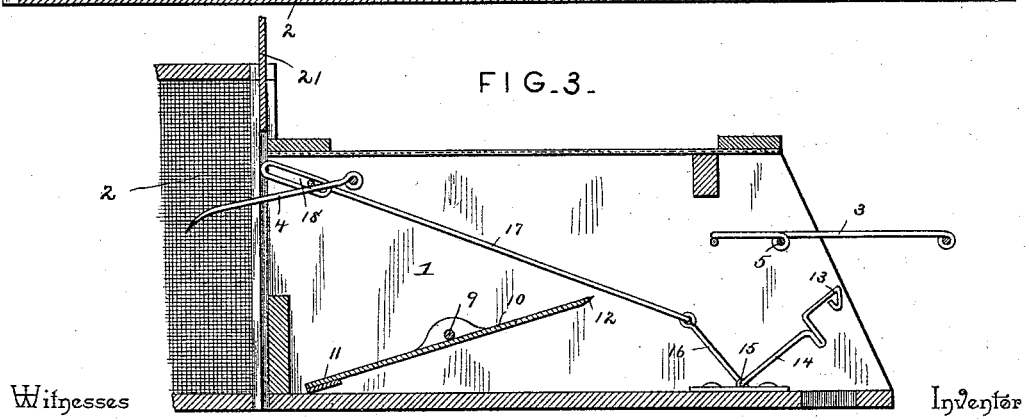

In the drawings, Figure 1 is a perspective view of a trap constructed in accordance with this invention. Fig. 2 is a central longitudinal sectional view. Fig. 3 is a similar view, the outer door being open.

Like numerals of reference indicate corresponding parts in all the figures of the drawings.

1 designates a frame of a trap, which is detachably connected with a cage 2 and is adapted to deliver the animals caught into the cage and to be reset by the animal caught in passing to the cage. The ends of the trap are open and provided with oscillating doors 3 and 4, the former of which is arranged at the outer end of the trap and is normally open and the latter is arranged at the inner end of the trap and opened into the cage and prevents the return or escape of animals therefrom. The front door is mounted on a pintle 5, which is provided at one end with an arm 6, which is connected by a rod 7 with an arm 8 of a rock-shaft 9, journaled in the sides of the trap and carrying a tilting platform 10, the inner portion 11 of which is heavier than the outer portion and is adapted to turn the arm 8 of the rock-shaft inward to open the front door 3. An animal in entering the trap treads upon the front portion 12 of the tilting platform and depresses the same, causing the front door to close and to be engaged by a latch 13, which holds the front door closed until the animal has passed through the rear door into the cage. In opening or raising the inner or rear door the latch 13 is lifted out of engagement with the front or outer door, permitting the latter to open and reset the trap. The latch 13 is arranged at the outer end of an arm 14 of a rock-shaft 15, which is provided with an arm 16, arranged adjacent to the inner faces of one of the sides of the trap and connected with the rear or inner door by a rod 17. The rear end of the rod is provided with a loop 18, which receives a wire of the inner door to allow the door a limited movement with opening the front door by releasing the latch 13, so that the front door can not be opened until the animal caught has passed through the rear door.

The trap is secured to the cage by hooks 19 and eyes 20 and the cage is provided with an opening at its front, which when the trap is detached is closed by a sliding door 21.

It will be seen that the trap is simple and comparatively inexpensive in construction and that it is self-setting and adapted to catch animals until the cage is full.

What I claim is—

1. In a trap, the combination of a frame having its ends open, oscillating doors arranged at the ends of the frame, a tilting platform arranged within the frame and connected with the door at the outer end of the frame and adapted to be depressed by an animal to close the door, and a latch arranged at the outer end of the trap and adapted to lock the adjacent door and connected with the door at the inner end of the trap and adapted to be withdrawn from engagement with the outer door by the opening of the inner door, substantially as described.

2. In a trap, the combination of a frame having its ends open, the inner and outer doors pivoted at the ends of the frame, the former being provided with an arm, a tilting platform having an arm, a rod connecting said arm, a rock-shaft having an arm provided with a latch to engage the outer door and having an arm 16, and a rod connected with the arm 16 and provided with a loop connected with the inner door, substantially as described.

In testimony that I claim the foregoing as my own I have hereto affixed my signature in the presence of two witnesses.

JOHN R. BROMWELL.

Witnesses:
F. A. GEAR,
J. A. SHARPE.